(12) United States Patent
Nyuugaku

(10) Patent No.: US 11,560,481 B2
(45) Date of Patent: Jan. 24, 2023

(54) SURFACE TREATMENT AGENT AND SURFACE TREATMENT METHOD USING THE SAME

(71) Applicant: Shin-Etsu Chemical Co., Ltd., Tokyo (JP)

(72) Inventor: Takeshi Nyuugaku, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/692,021

(22) Filed: Nov. 22, 2019

(65) Prior Publication Data

US 2020/0172737 A1  Jun. 4, 2020

(30) Foreign Application Priority Data

Dec. 4, 2018 (JP) .............................. JP2018-226982

(51) Int. Cl.
  *C09D 5/00* (2006.01)
  *C03C 17/30* (2006.01)
  *C07F 7/10* (2006.01)

(52) U.S. Cl.
  CPC ............... *C09D 5/00* (2013.01); *C03C 17/30* (2013.01); *C07F 7/10* (2013.01); *C03C 2217/76* (2013.01); *C03C 2218/111* (2013.01)

(58) Field of Classification Search
  None
  See application file for complete search history.

(56) References Cited

U.S. PATENT DOCUMENTS

2004/0077892 A1* 4/2004 Arkles ...................... C07F 7/10
556/407

FOREIGN PATENT DOCUMENTS

| DE | 101 40 563 A1 | 2/2003 |
| JP | 2015160811 A * | 9/2015 |
| WO | WO 03/091186 A2 | 11/2003 |

OTHER PUBLICATIONS

English machine translation JP-2015160811-A (2015).*
CAS Registry No. 618914-44-6, Scifinder, ACS (2021).*

* cited by examiner

*Primary Examiner* — Kenneth J Stachel
(74) *Attorney, Agent, or Firm* — Birch, Stewart, Kolasch & Birch, LLP

(57) ABSTRACT

Provided is a surface treatment agent including an alkoxysilane compound having a cyclic silazane structure represented by the following general formula (1):

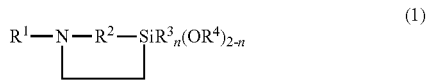

wherein $R^1$ represents an unsubstituted linear alkyl group having 6 to 20 carbon atoms, $R^2$ represents a substituted or unsubstituted alkylene group having 3 to 6 carbon atoms that may include a heteroatom, $R^3$ and $R^4$ each independently represent a substituted or unsubstituted monovalent hydrocarbon group having 1 to 10 carbon atoms, and n represents an integer of 0 or 1.

11 Claims, 8 Drawing Sheets

SURFACE TREATMENT AGENT AND SURFACE TREATMENT METHOD USING THE SAME

CROSS-REFERENCE TO RELATED APPLICATION

This non-provisional application claims priority under 35 U.S.C. § 119(a) on Patent Application No. 2018-226982 filed in Japan on Dec. 4, 2018, the entire contents of which are hereby incorporated by reference.

TECHNICAL FIELD

The present invention relates to a surface treatment agent and a surface treatment method using the same, and more specifically to a surface treatment agent containing an alkoxysilane compound having a cyclic silazane structure and a surface treatment method using the same.

BACKGROUND ART

Conventionally, surface treatment agents that can impart various properties to the surface of a substrate of an inorganic material, organic material, or the like by performing surface treatment by chemical modification on the surface of the substrate have been developed.

Among the surface treatment agents described above, an organosilicon compound having a hydrolyzable silyl group and an organic group enables bonding an organic material and an inorganic material together, which is normally unlikely to be bonded, because a silanol group generated by hydrolysis of the hydrolyzable silyl group forms a covalent bond with a hydroxyl group on the surface of the substrate and the organic group reacts with the organic material. As a result of this, the organosilicon compound is capable of imparting properties such as heat resistance, water resistance, weather resistance, improved mechanical strength, adhesion, dispersibility, hydrophobicity, rust resistance, and the like to organic-inorganic composite materials, and is therefore known as a compound particularly useful as a surface treatment agent.

Examples of the organosilicon compound include alkoxysilane compounds having an amino group such as 3-(n-butylamino)propyltrimethoxysilane (Patent Document 1), and alkoxysilane compounds having a cyclic silazane structure such as 2,2-dimethoxy-1-butyl-1-aza-2-silacyclopentane (Patent Document 2).

CITATION LIST

Patent Document 1: DE 10140563
Patent Document 2: WO 2003/091186

SUMMARY OF THE INVENTION

However, if the alkoxysilane compounds having an amino group described in Patent Document 1 are used as surface treatment agents, a considerable amount of alcohol is generated by hydrolysis of the alkoxysilyl group. In recent years, reduction of volatile organic compounds has been a major theme in environmental issues closely related to global warming, health issues, and the like, and alkoxysilane compounds described above generate a large amount of alcohol and it is concerned that the alkoxysilane compounds have a heavy impact on the environment.

Moreover, since silanol groups produced by hydrolysis condense to produce siloxane, the reactivity with the hydroxyl group on the surface of the substrate may be degraded. In order to sufficiently react the silanol groups with the hydroxyl groups on the surface of the substrate, it is necessary to increase the reaction temperature or lengthen the reaction time, but in this case, the productivity is lowered. In addition, if unreacted silanol groups are present, the surface of the substrate after the surface treatment is in a state in which silanol groups and amino groups are mixed, so that a desired effect derived from the amino groups may not be sufficiently exhibited.

As one method for reducing the amount of alcohol generated from an alkoxysilane compound having an amino group, there is known a method in which an amino group and an alkoxysilyl group are cyclized in the molecule to derive a cyclic silazane structure (Patent Document 2). This cyclic silazane structure reacts with a hydroxyl group on the surface of the substrate without hydrolysis to form a covalent bond, and therefore, has a merit that, when used as a surface treatment agent, the problem of hydrolysis in the alkoxysilane compound having the amino group described above does not occur.

However, the reactivity of the alkoxysilane compound having a cyclic silazane structure described in Patent Document 2 with the hydroxyl group on the surface of the substrate varies greatly depending on the steric hindrance of a substituent of the amino group. In addition, for the alkoxysilyl group to react with another hydroxyl group on the surface of the substrate to form a covalent bond after the cyclic silazane structure reacts with the hydroxyl group on the surface of the substrate to form a covalent bond, it is necessary to hydrolyze the alkoxysilyl group by performing post-treatment such as exposure to a humid atmosphere.

That is, if the substituent of the amino group is a cyclic silazane structure having a large steric hindrance such as a t-butyl group or a phenyl group, the reactivity with the hydroxyl group on the surface of the substrate is low, and thus the surface treatment is difficult to complete. In order to sufficiently react the silanol groups with the hydroxyl groups on the surface of the substrate, it is necessary to increase the reaction temperature or lengthen the reaction time, but in this case, the productivity is lowered. In addition, if the substituent of the amino group is a cyclic silazane structure having a small steric hindrance such as an n-butyl group, the cyclic silazane structure easily reacts with a hydroxyl group on the surface of the substrate to form a covalent bond. However, at the time of hydrolysis in the post-treatment, the covalent bond portion with the substrate is also hydrolyzed in addition to the alkoxysilyl group, so that there are problems such as low durability and low stability of the substrate after the surface treatment.

Therefore, development of a surface treatment agent containing an alkoxysilane compound having a cyclic silazane structure in which the cyclic silazane structure easily reacts with a hydroxyl group on the surface of the substrate to form a covalent bond and the covalent bond portion with the substrate is not hydrolyzed during hydrolysis in the post-treatment has been desired.

The present invention has been made in view of the above circumstances, and an object thereof is to provide a surface treatment agent containing an alkoxysilane compound having a cyclic silazane structure in which the cyclic silazane structure easily reacts with a hydroxyl group on the surface of the substrate to form a covalent bond and the covalent bond portion with the substrate is not hydrolyzed during hydrolysis in the post-treatment and a surface treatment method using the same.

As a result of diligent studies to solve the above problems, the present inventor has found that a cyclic silazane structure easily reacts with a hydroxyl group on the surface of the substrate to form a covalent bond by treating the surface of the substrate by using a surface treatment agent containing an alkoxysilane compound having a cyclic silazane structure in which a substituent of the amino group is a linear alkyl group having a predetermined carbon number and that the covalent bond portion with the substrate is not hydrolyzed during hydrolysis in post-treatment, and thus has completed the invention.

That is, the present invention provides:
1. a surface treatment agent including an alkoxysilane compound having a cyclic silazane structure represented by the following general formula (1)

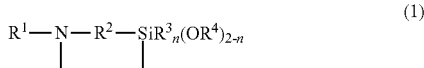

(1)

wherein $R^1$ represents an unsubstituted linear alkyl group having 6 to 20 carbon atoms, $R^2$ represents a substituted or unsubstituted alkylene group having 3 to 6 carbon atoms that may include a heteroatom, $R^3$ and $R^4$ each independently represent a substituted or unsubstituted monovalent hydrocarbon group having 1 to 10 carbon atoms, and n represents an integer of 0 or 1;
2. the surface treatment agent according to 1, wherein $R^1$ represents an unsubstituted linear alkyl group having 8 to 14 carbon atoms;
3. the surface treatment agent according to 1 or 2, including a solvent; or
4. a surface treatment method including applying the surface treatment agent according to any one of 1 to 3 on a substrate, bringing the surface treatment agent into contact with the substrate, or mixing the surface treatment agent with the substrate.

Advantageous Effects of the Invention

According to the surface treatment agent of the present invention and the surface treatment method using the same, the cyclic silazane structure easily reacts with a hydroxyl group on the surface of the substrate to form a covalent bond, and thus the surface treatment can be completed in a short reaction time. Furthermore, since the covalent bond portion with the substrate is not hydrolyze during hydrolysis in post-treatment, durability and stability of the substrate after the surface treatment can be improved.

DESCRIPTION OF THE PREFERRED EMBODIMENTS

Figure 1:
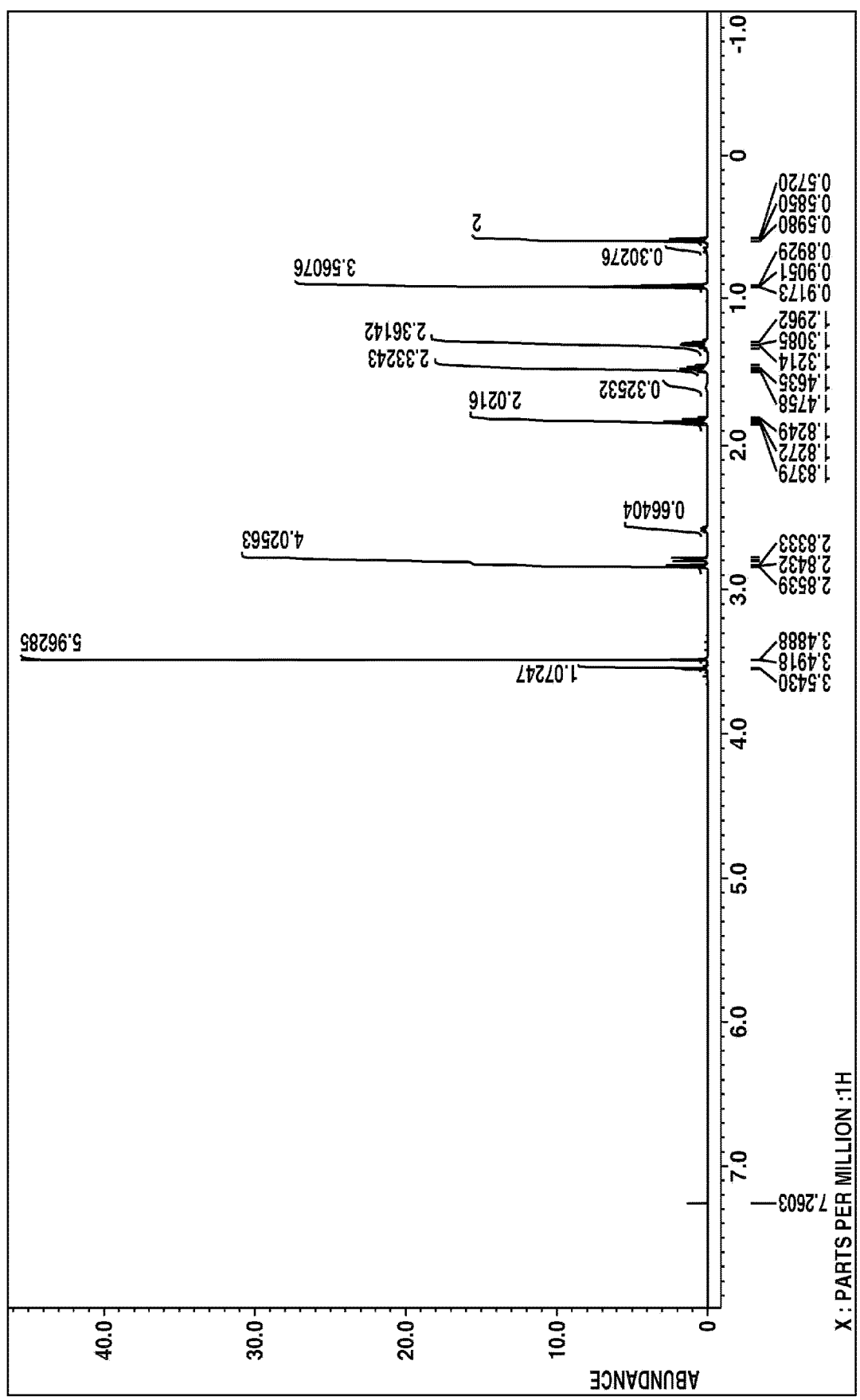
FIG. 1 is a $^1$H-NMR spectrum diagram of a compound obtained in Synthesis Example 1.

Hereinafter, the present invention will be specifically described.

A surface treatment agent according to the present invention includes an alkoxysilane compound having a cyclic silazane structure represented by the following general formula (1).

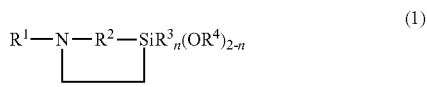

(1)

In the above general formula (1), $R^1$ represents an unsubstituted linear alkyl group having 6 to 20 carbon atoms, preferably 8 to 16 carbon atoms, or more preferably 8 to 14 carbon atoms.

In the case of a linear alkyl group having a longer chain than 20 carbon atoms, that is, in the case where the substituent of the amino group is a cyclic silazane structure having a large steric hindrance, the reactivity with the hydroxyl group on the surface of the substrate is low, and thus the surface treatment is difficult to complete. Further, in the case of a linear alkyl group having a shorter chain than 6 carbon atoms, that is, in the case where the substituent of the amino group is a cyclic silazane structure having a small steric hindrance, the cyclic silazane structure easily reacts with a hydroxyl group on the surface of the substrate to form a covalent bond. However, since the covalent bond portion with the substrate is also hydrolyzed in addition to the alkoxysilyl group during hydrolysis in the post-treatment, durability and stability of the substrate after the surface treatment can be improved.

In contrast, in a linear alkyl group having 6 to 20 carbon atoms, the cyclic silazane structure easily reacts with a hydroxyl group on the surface of the substrate to form a covalent bond and the covalent bond portion with the substrate is not hydrolyzed during hydrolysis in the post-treatment, and therefore the durability and stability of the substrate after the surface treatment can be improved by a surface treatment agent containing the alkoxysilane compound represented by the above general formula (1). Particularly, a linear alkyl group having 8 to 14 carbon atoms is particularly excellent in reactivity with the hydroxyl group on the surface of the substrate, and can significantly improve the durability and stability of the substrate after the surface treatment.

Specific examples of the unsubstituted linear alkyl group having 6 to 20 carbon atoms corresponding to $R^1$ include n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl groups.

Among these, as $R^1$, particularly from the viewpoint of availability of precursor raw materials, an n-hexyl group, an n-octyl group, an n-decyl group, an n-dodecyl group, an n-tetradecyl group, an n-hexadecyl group, an n-octadecyl group, and an n-icosyl group are more preferable, and from the viewpoints of reactivity with hydroxyl groups on the surface of the substrate and durability and stability of the substrate after the surface treatment, an n-octyl group, an n-decyl group, an n-dodecyl group, and an n-tetradecyl group, which are unsubstituted linear alkyl groups having 8 to 14 carbon atoms, are even more preferable.

In addition, in the above general formula (1), $R^2$ represents a substituted or unsubstituted alkylene group that may include a heteroatom having 3 to 6 carbon atoms, preferably 3 to 5 carbon atoms, or more preferably 3 or 4 carbon atoms.

The alkylene group having 3 to 6 carbon atoms may be linear, branched, or cyclic, and specific examples thereof include trimethylene, propylene, tetramethylene, and isobutylene groups.

These alkylene groups may include a heteroatom and may have one or more of ether groups, ester groups, carbonyl groups, sulfide groups, disulfide groups and the like interposed in the molecular chain.

In addition, some or all of the hydrogen atoms of these alkylene groups may be substituted with other substituents. Specific examples of the substituents include alkoxy groups having 1 to 3 carbon atoms such as methoxy, ethoxy, and (iso)propoxy groups; halogen atoms such as fluorine, chlorine, and bromine; aromatic hydrocarbon groups such as a phenyl group; and a cyano group, an amino group, an ester group, an ether group, a carbonyl group, an acyl group, a sulfide group, and so forth, and one or more of these may be used in combination. The substitution position of these substituents is not particularly limited, and the number of substituents is neither limited.

Among these, as $R^2$, an unsubstituted linear alkylene group having 3 or 4 carbon atoms is preferable, and in particular, a trimethylene group is more preferable from the viewpoint of availability of a precursor raw material.

In the above general formula (1), $R^3$ and $R^4$ each independently represent a substituted or unsubstituted monovalent hydrocarbon group having 1 to 10 carbon atoms, preferably 1 to 8 carbon atoms, and more preferably 1 to 6 carbon atoms.

The monovalent hydrocarbon group having 1 to 10 carbon atoms may be linear, branched, or cyclic, and specific examples thereof include linear alkyl groups such as methyl, ethyl, n-propyl, n-butyl, n-pentyl, n-hexyl, n-heptyl, n-octyl, n-nonyl, and n-decyl groups; branched alkyl groups such as isopropyl, isobutyl, tert-butyl, sec-butyl, isopentyl, neopentyl, isohexyl, isoheptyl, isooctyl, tert-octyl, isononyl, and isodecyl groups; cyclic alkyl groups such as cyclopentyl and cyclohexyl groups; alkenyl groups such as vinyl, allyl, butenyl, and methallyl groups; aryl groups such as phenyl, tolyl, and xylyl groups; and aralkyl groups such as benzyl and phenethyl groups.

Among these, as $R^3$ and $R^4$, unsubstituted linear alkyl group having 1 to 6 carbon atoms are preferable, and from the viewpoint of easy availability of a precursor raw material, unsubstituted linear alkyl groups having 1 to 3 carbon atoms is more preferable, and a methyl group and an ethyl group are even more preferable.

Note that some or all of these monovalent hydrocarbon groups may be substituted by another substituent, and examples of the substituent include the same groups as those exemplified for $R^2$.

In the general formula (1) above, n represents an integer of 0 or 1, and is preferably 0 from the viewpoint of increasing adhesion by reacting with a plurality of hydroxyl groups on the surface of the substrate, particularly when used as a surface treatment agent.

Specific examples of the alkoxysilane compounds having a cyclic silazane structure represented by the general formula (1) include 2,2-dimethoxy-1-n-hexyl-1-aza-2-silacyclopentane, 2,2-dimethoxy-1-n-octyl-1-aza-2-silacyclopentane, 2,2-dimethoxy-1-n-decyl-1-aza-2-silacyclopentane, 2,2-dimethoxy-1-n-dodecyl-1-aza-2-silacyclopentane, 2,2-dimethoxy-1-n-tetradecyl-1-aza-2-silacyclopentane, 2,2-dimethoxy-1-n-hexadecyl-1-aza-2-silacyclopentane, 2,2-dimethoxy-1-n-octadecyl-1-aza-2-silacyclopentane, 2,2-dimethoxy-1-n-icosyl-1-aza-2-silacyclopentane, 2-methoxy-2-methyl-1-n-hexyl-1-aza-2-silacyclopentane, 2-methoxy-2-methyl-1-n-octyl-1-aza-2-silacyclopentane, 2-methoxy-2-methyl-1-n-decyl-1-aza-2-silacyclopentane, 2-methoxy-2-methyl-1-n-dodecyl-1-aza-2-silacyclopentane, 2-methoxy-2-methyl-1-n-tetradecyl-1-aza-2-silacyclopentane, 2-methoxy-2-methyl-1-n-hexadecyl-1-aza-2-silacyclopentane, 2-methoxy-2-methyl-1-n-octadecyl-1-aza-2-silacyclopentane, 2-methoxy-2-methyl-1-n-icosyl-1-aza-2-silacyclopentane, 2,2-diethoxy-1-n-hexyl-1-aza-2-silacyclopentane, 2,2-diethoxy-1-n-octyl-1-aza-2-silacyclopentane, 2,2-diethoxy-1-n-decyl-1-aza-2-silacyclopentane, 2,2-diethoxy-1-n-dodecyl-1-aza-2-silacyclopentane, 2,2-diethoxy-1-n-tetradecyl-1-aza-2-silacyclopentane, 2,2-diethoxy-1-n-hexadecyl-1-aza-2-silacyclopentane, 2,2-diethoxy-1-n-octadecyl-1-aza-2-silacyclopentane, 2,2-diethoxy-1-n-icosyl-1-aza-2-silacyclopentane, 2-ethoxy-2-methyl-1-n-hexyl-1-aza-2-silacyclopentane, 2-ethoxy-2-methyl-1-n-octyl-1-aza-2-silacyclopentane, 2-ethoxy-2-methyl-1-n-decyl-1-aza-2-silacyclopentane, 2-ethoxy-2-methyl-1-n-dodecyl-1-aza-2-silacyclopentane, 2-ethoxy-2-methyl-1-n-tetradecyl-1-aza-2-silacyclopentane, 2-ethoxy-2-methyl-1-n-hexadecyl-1-aza-2-silacyclopentane, 2-ethoxy-2-methyl-1-n-octadecyl-1-aza-2-silacyclopentane, 2-ethoxy-2-methyl-1-n-icosyl-1-aza-2-silacyclopentane, 2-ethoxy-2-methoxy-1-n-hexyl-1-aza-2-silacyclopentane, 2-ethoxy-2-methoxy-1-n-octyl-1-aza-2-silacyclopentane, 2-ethoxy-2-methoxy-1-n-decyl-1-aza-2-silacyclopentane, 2-ethoxy-2-methoxy-1-n-dodecyl-1-aza-2-silacyclopentane, 2-ethoxy-2-methoxy-1-n-tetradecyl-1-aza-2-silacyclopentane, 2-ethoxy-2-methoxy-1-n-hexadecyl-1-aza-2-silacyclopentane, 2-ethoxy-2-methoxy-1-n-octadecyl-1-aza-2-silacyclopentane, and 2-ethoxy-2-methoxy-1-n-icosyl-1-aza-2-silacyclopentane.

Among these, 2,2-dimethoxy-1-n-octyl-1-aza-2-silacyclopentane, 2,2-dimethoxy-1-n-decyl-1-aza-2-silacyclopentane, 2,2-dimethoxy-1-n-dodecyl-1-aza-2-silacyclopentane, 2,2-dimethoxy-1-n-tetradecyl-1-aza-2-silacyclopentane, 2,2-diethoxy-1-n-octyl-1-aza-2-silacyclopentane, 2,2-diethoxy-1-n-decyl-1-aza-2-silacyclopentane, 2,2-diethoxy-1-n-dodecyl-1-aza-2-silacyclopentane, and 2,2-diethoxy-1-n-tetradecyl-1-aza-2-silacyclopentane in which $R^1$ is an unsubstituted linear alkyl group having 8 to 14 carbon atoms, $R^2$ is a trimethylene group, $R^3$ and $R^4$ are each independently a methyl group or an ethyl group, and n is an integer of 0, are particularly preferable from the viewpoint of reactivity with a hydroxyl group on the surface of the substrate when used as a surface treatment agent and durability and stability of the substrate after the surface treatment.

When performing surface treatment of the substrate by using the surface treatment agent containing an alkoxysilane compound having a cyclic silazane structure (hereinafter simply referred to as a surface treatment agent), although there is no problem in using the alkoxysilane compound having a cyclic silazane structure as it is. Although there is no problem, the alkoxysilane compound having a cyclic silazane structure may be used in a state of being diluted with a solvent.

Specific examples of the solvent include hydrocarbon solvents such as pentane, hexane, cyclohexane, heptane, isooctane, benzene, toluene, and xylene; ketone solvents such as acetone and methyl isobutyl ketone; ether solvents such as diethyl ether, tetrahydrofuran, and dioxane; ester solvents such as ethyl acetate and butyl acetate; aprotic polar solvents such as acetonitrile and N, N-dimethylformamide; and chlorinated hydrocarbon solvents such as dichloromethane and chloroform, and these solvents may be used alone, in a mixture of two or more kinds. Among these, hydrocarbon solvents and ether solvents are particularly preferable from the viewpoint of compatibility with the alkoxysilane compound having a cyclic silazane structure.

The concentration of the alkoxysilane compound having a cyclic silazane structure that is used is not particularly limited, but from the viewpoint of reactivity and productivity, the alkoxysilane compound having a cyclic silazane structure may be used by being diluted with a solvent described above such that the content of the alkoxysilane compound having a cyclic silazane structure is in a range of 0.001 to 50% by weight, preferably 0.1 to 20% by weight, and more preferably 0.1 to 10% by weight. If the concentration of the alkoxysilane compound having a cyclic silazane structure is less than 0.001% by weight, the surface treatment may not be sufficiently performed, and if the concentration exceeds 50% by weight, the effect of imparting the properties by the surface treatment peaks, and the amount of use of the alkoxysilane compound having a cyclic silazane structure just increases, which is not economical.

By performing the surface treatment of the substrate by using the surface treatment agent of the present invention described above, the durability and stability of the substrate after the surface treatment can be improved.

Next, a surface treatment method using the surface treatment agent of the present invention is described.

There are no particular limitations on the method of performing the surface treatment of the substrate by using the surface treatment agent of the present invention, and examples thereof include a method of applying the surface treatment agent on the substrate, a method of entraining the surface treatment agent in an inert gas and bringing the substrate into contact with the entrained gas, and a method of directly mixing the surface treatment agent with the substrate with a mixer or a mill.

Examples of the method of applying the surface treatment agent include a brush coating method, a spray coating method, a wire bar method, a blade method, a roll coating method, and a dipping method.

The time (reaction time) for applying the surface treatment agent of the present invention on the substrate, bringing the surface treatment agent into contact with the substrate, or mixing the surface treatment agent with the substrate is not particularly limited, and is preferably 1 second to 10 minutes, more preferably 1 second to 5 minutes, and even more preferably 1 second to 1 minute from the viewpoint of reactivity and productivity.

Further, the temperature (reaction temperature) when applying the surface treatment agent of the present invention on the substrate, bringing the surface treatment agent into contact with the substrate, or mixing the surface treatment agent with the substrate is not particularly limited, and is preferably 0 to 100° C., more preferably 10 to 50° C., and even more preferably 20 to 30° C. from the viewpoint of reactivity and productivity. However, the reaction temperature may be appropriately set in consideration of a relationship with the reaction time described above.

The substrate on which the surface treatment is performed may be either an inorganic material or an organic material.

Examples of the inorganic material include silicon compounds such as glass plates, glass fibers, diatomaceous earth, calcium silicate, silica, silicon, talc, and mica; metal oxides such as zinc oxide, aluminum oxide, tin oxide, titanium oxide, iron oxide, and magnesium oxide; metal hydroxides such as aluminum hydroxide and magnesium hydroxide; and carbonates such as calcium carbonate, zinc carbonate, and magnesium carbonate, and the silicon compounds and metal oxides are particularly preferable from the viewpoint of reactivity with the alkoxysilane compound having a cyclic silazane structure.

Examples of the organic material include natural polymers such as rubber, paper, and cellulose; synthetic polymers such as acrylic resins, urethane resins, epoxy resins, and phenol resins; and oils and fats, surfactants, and liquid crystals, and natural polymers and synthetic polymers are particularly preferable from the viewpoint of reactivity with the alkoxysilane compound having a cyclic silazane structure.

After surface treatment of the substrate is performed by using the surface treatment agent of the present invention, excess surface treatment agent is removed by washing, drying, or the like. The post-treatment by washing and the post-treatment by drying may be performed alone or in combination.

There is no particular limitation on a washing solvent, and the same things as the solvents exemplified as solvents for diluting the alkoxysilane compound having a cyclic silazane structure may be used.

There is no particular limitation on a washing method, and a method of immersing the substrate after the surface treatment in the washing solvent, a method of spraying the washing solvent onto the substrate after the surface treatment, or the like may be employed.

The cleaning time is not particularly limited as long as the substrate after the surface treatment is not adversely affected, and is preferably 1 to 240 minutes, more preferably 1 to 180 minutes, and even more preferably 1 to 120 minutes from the viewpoint of productivity.

The cleaning temperature is not particularly limited as long as the substrate after the surface treatment is not adversely affected, and is preferably 0 to 200° C., more preferably 0 to 150° C., and even more preferably 0 to 100° C. from the viewpoint of productivity. The cleaning temperature may be appropriately set in consideration of a relationship with the cleaning time described above.

The drying time is not particularly limited as long as the substrate after the surface treatment is not adversely affected, and is preferably 1 to 240 minutes, more preferably 1 to 180 minutes, and even more preferably 1 to 120 minutes from the viewpoint of productivity.

The drying temperature is not particularly limited as long as the substrate after the surface treatment is not adversely affected, and is preferably 0 to 200° C., more preferably 0 to 150° C., and even more preferably 0 to 100° C. from the viewpoint of productivity. The drying temperature may be appropriately set in consideration of a relationship with the drying time described above.

The substrate after removing the excess surface treatment agent is exposed to a humid atmosphere to hydrolyze the alkoxysilyl group.

There is no particular limitation on the method of exposing the substrate to the humid atmosphere, and a method of immersing the substrate in pure water such as ion-exchanged water or distilled water, a method of treating the substrate at a predetermined humidity using a thermo-hygrostat, or the like can be employed.

The time of exposure (exposure time) to the humid atmosphere is not particularly limited as long as the substrate after the surface treatment is not adversely affected, and is preferably 1 to 240 minutes, more preferably 1 to 180 minutes, and even more preferably 1 to 120 minutes from the viewpoint of productivity.

The temperature of exposure (exposure temperature) to the humid atmosphere is not particularly limited as long as the substrate after the surface treatment is not adversely affected, and is preferably 0 to 100° C., more preferably 10 to 80° C., and even more preferably 20 to 60° C. from the viewpoint of productivity. The exposure temperature may be appropriately set in consideration of a relationship with the exposure time described above.

The surface treatment agent of the present invention can be also used as a composition containing one or more other additives selected from a pigment, an antifoaming agent, a lubricant, an antiseptic, a pH adjuster, a film forming agent, an antistatic agent, an antibacterial agent, a surfactant, a dye, and the like as long as the effects of the present invention are not impaired.

EXAMPLES

Hereinafter, although the present invention is more specifically described with reference to Synthesis Examples, Examples, and Comparative Examples the present invention is not limited to the following Examples.

[1] Synthesis of Alkoxysilane Compound Having Cyclic Silazane Structure

Synthesis Example 1

Synthesis of
2,2-dimethoxy-1-n-butyl-1-aza-2-silacyclopentane

A flask equipped with a stirrer, a reflux condenser, a dropping funnel, and a thermometer was charged with 292.6 g (4.000 mol) of n-butylamine and heated to 78° C. After the internal temperature was stabilized, 198.7 g (1.000 mol) of chloropropyltrimethoxysilane was added dropwise over 10 hours, and the system was stirred at that temperature for 50 hours. After cooling the system to room temperature, n-butylamine hydrochloride generated by the reaction was removed by filtration to obtain 362.6 g of a precursor reaction solution.

Next, a flask equipped with a stirrer, a reflux condenser, a fractionation head, and a thermometer was charged with 362.6 g of the precursor reaction solution and 3.8 g (0.020 mol) of a methanol solution of sodium methoxide (28% by weight sodium methoxide), and 136.3 g of a colorless transparent fraction having a boiling point of 47 to 48° C./0.2 kPa was obtained by performing distillation while distilling off generated methanol.

Figure 2:
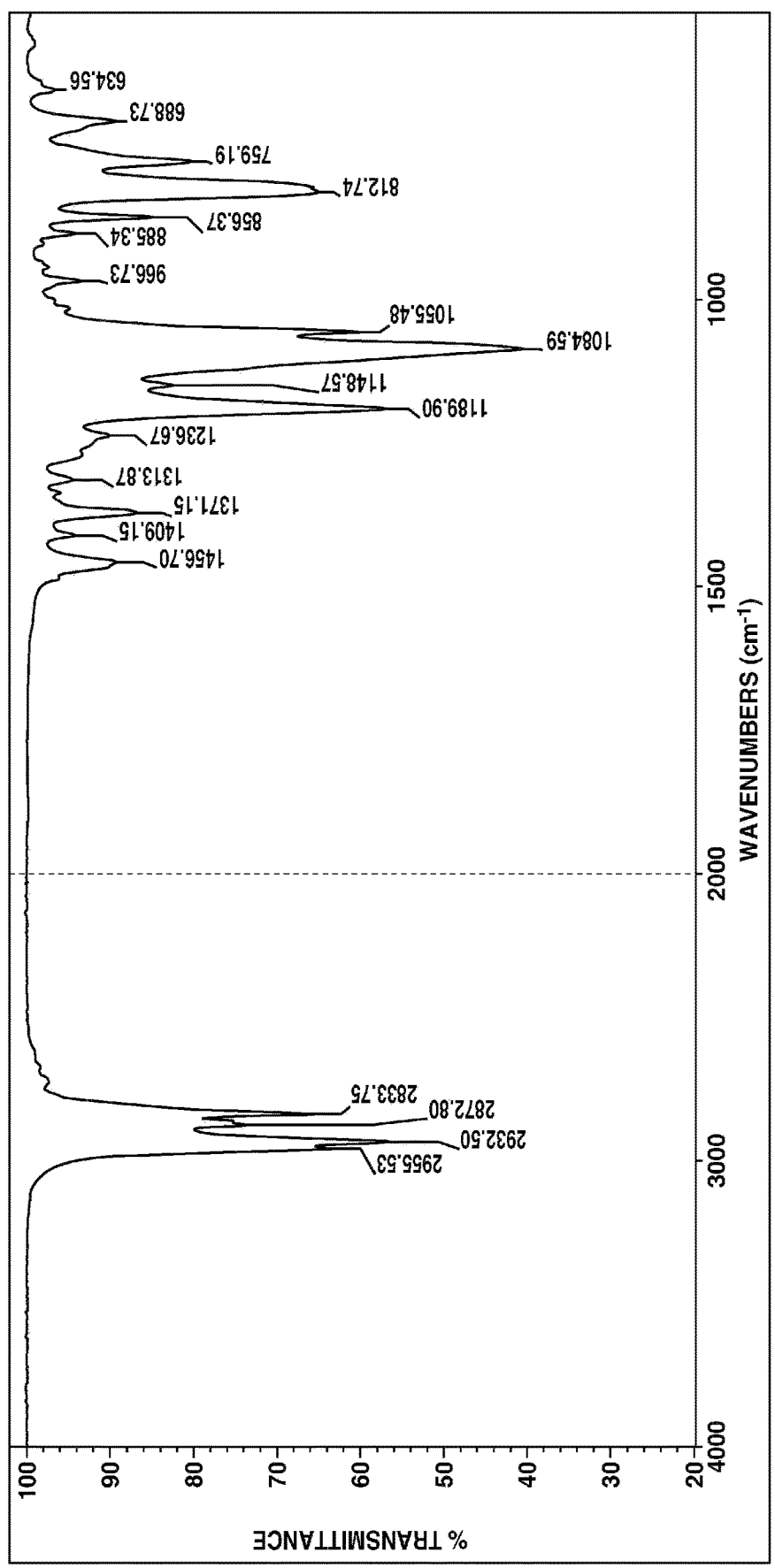
FIG. 2 is an IR spectrum diagram of the compound obtained in Synthesis Example 1.

The obtained fraction was subjected to $^1$H-NMR spectrum (deuterated chloroform solvent) measurement and IR spectrum measurement. The results are shown in FIGS. 1 and 2, respectively.

From the above results, it was confirmed that the obtained fraction was 2,2-dimethoxy-1-n-butyl-1-aza-2-silacyclopentane.

Synthesis Example 2

Synthesis of
2,2-dimethoxy-1-n-octyl-1-aza-2-silacyclopentane

A flask equipped with a stirrer, a reflux condenser, a dropping funnel, and a thermometer was charged with 517.2 g (4.000 mol) of n-octylamine and heated to 150° C. After the internal temperature was stabilized, 198.7 g (1.000 mol) of chloropropyltrimethoxysilane was added dropwise over 10 hours, and the system was stirred at that temperature for 10 hours. After cooling the system to room temperature, n-octylamine hydrochloride generated by the reaction was removed by filtration to obtain 522.6 g of a precursor reaction solution.

Next, a flask equipped with a stirrer, a reflux condenser, a fractionation head, and a thermometer was charged with 522.6 g of the precursor reaction solution and 3.8 g (0.020 mol) of a methanol solution of sodium methoxide (28% by weight sodium methoxide), and 233.6 g of a colorless transparent fraction having a boiling point of 104 to 105° C./0.2 kPa was obtained by performing distillation while distilling off generated methanol.

Figure 3:
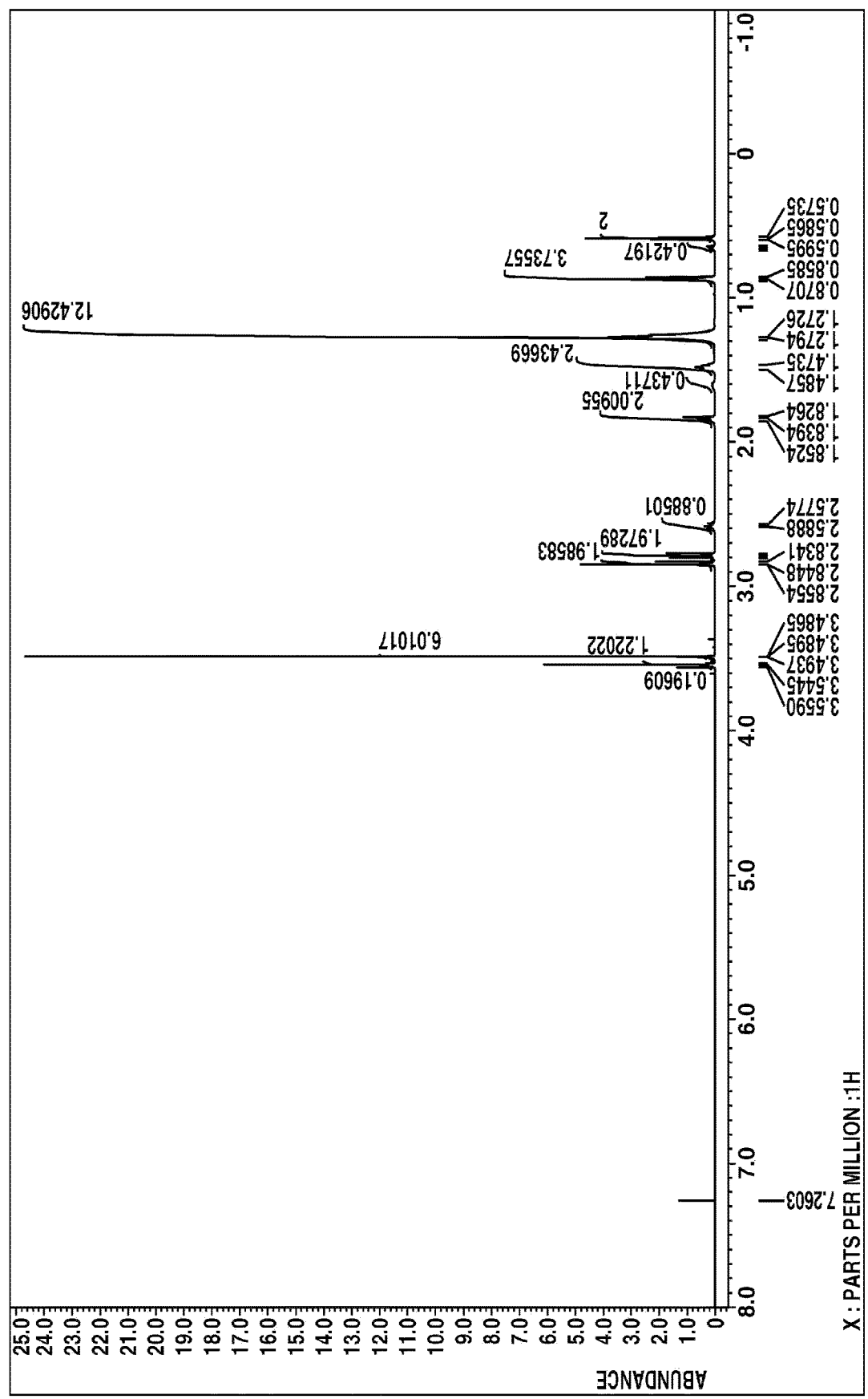
FIG. 3 is a $^1$H-NMR spectrum diagram of a compound obtained in Synthesis Example 2.
Figure 4:
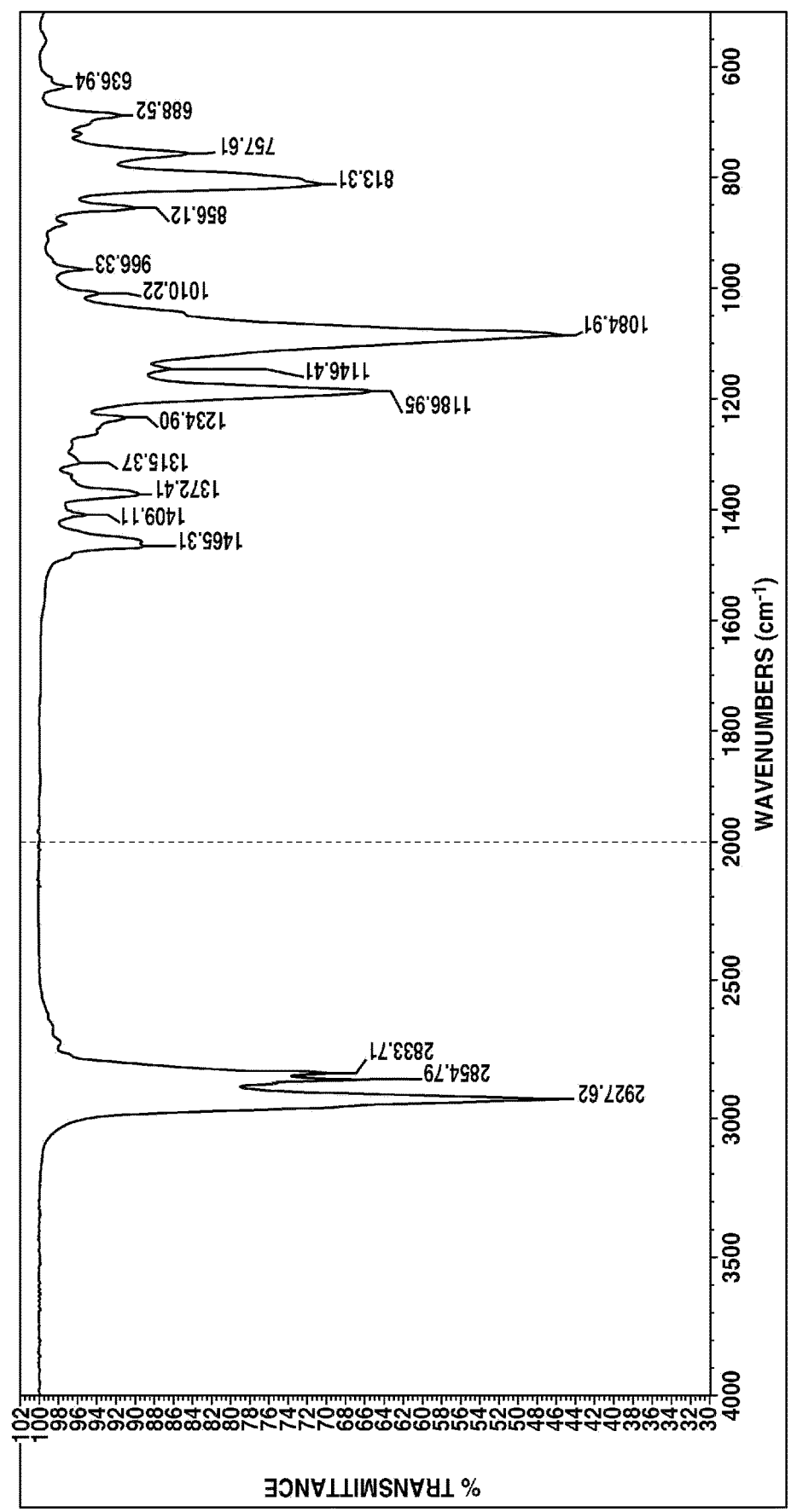
FIG. 4 is an IR spectrum diagram of the compound obtained in Synthesis Example 2.

The obtained fraction was subjected to $^1$H-NMR spectrum (deuterated chloroform solvent) measurement and IR spectrum measurement. The results are shown in FIGS. 3 and 4, respectively.

From the above results, it was confirmed that the obtained fraction was 2,2-dimethoxy-1-n-octyl-1-aza-2-silacyclopentane.

Synthesis Example 3

Synthesis of 2,2-dimethoxy-1-n-tetradecyl-1-aza-2-silacyclopentane

A flask equipped with a stirrer, a reflux condenser, a dropping funnel, and a thermometer was charged with 853.6 g (4.000 mol) of n-tetradecylamine and heated to 150° C. After the internal temperature was stabilized, 198.7 g (1.000 mol) of chloropropyltrimethoxysilane was added dropwise over 10 hours, and the system was stirred at that temperature for 10 hours. After cooling the system to room temperature, n-tetradecylamine hydrochloride generated by the reaction was removed by filtration to obtain 763.2 g of a precursor reaction solution.

Next, a flask equipped with a stirrer, a reflux condenser, a fractionation head, and a thermometer was charged with 763.2 g of the precursor reaction solution and 3.8 g (0.020 mol) of a methanol solution of sodium methoxide (28% by weight sodium methoxide), and 307.5 g of a colorless transparent fraction having a boiling point of 167 to 168° C./0.2 kPa was obtained by performing distillation while distilling off generated methanol.

Figure 5:
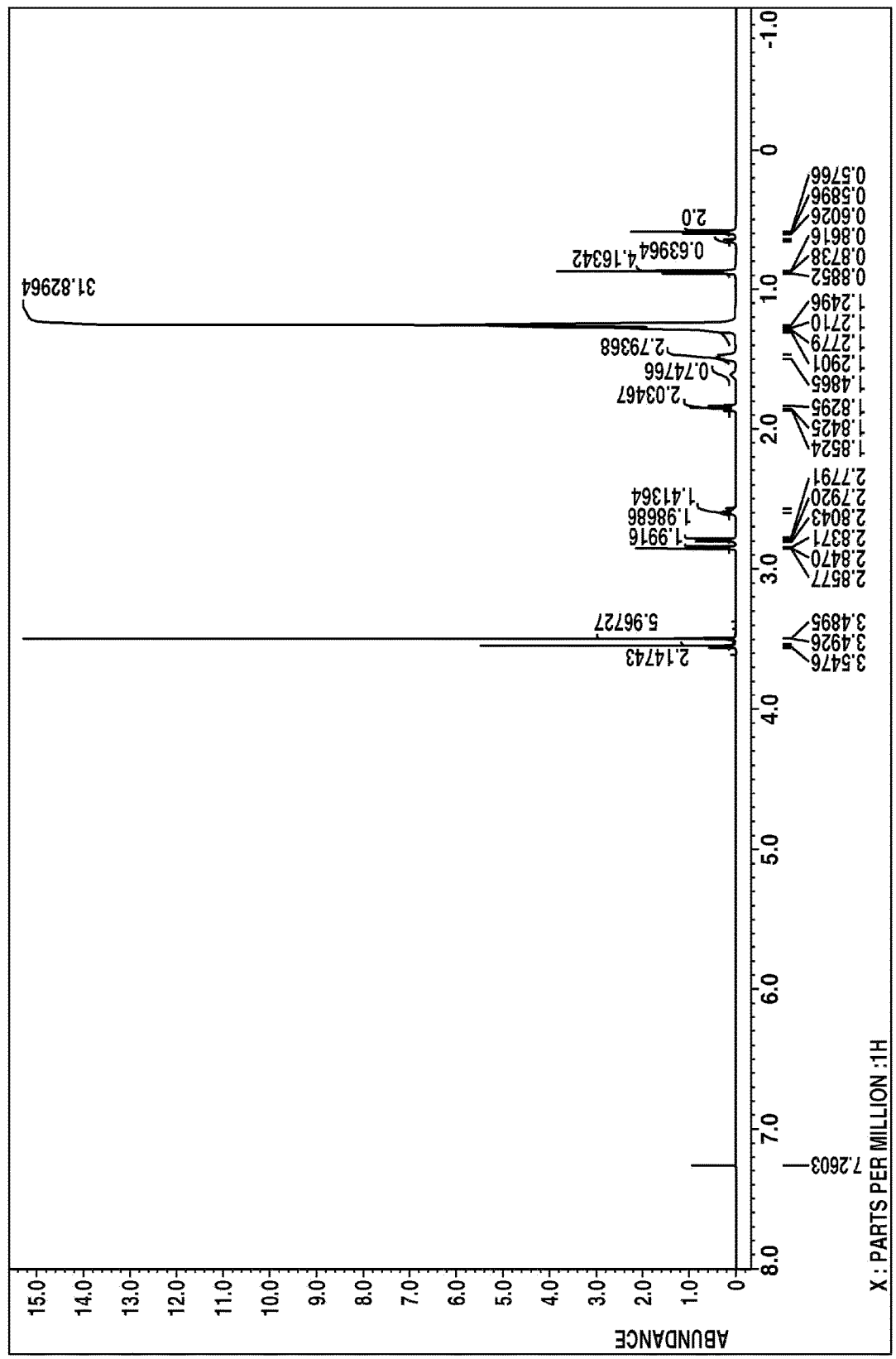
FIG. 5 is a $^1$H-NMR spectrum diagram of a compound obtained in Synthesis Example 3.
Figure 6:
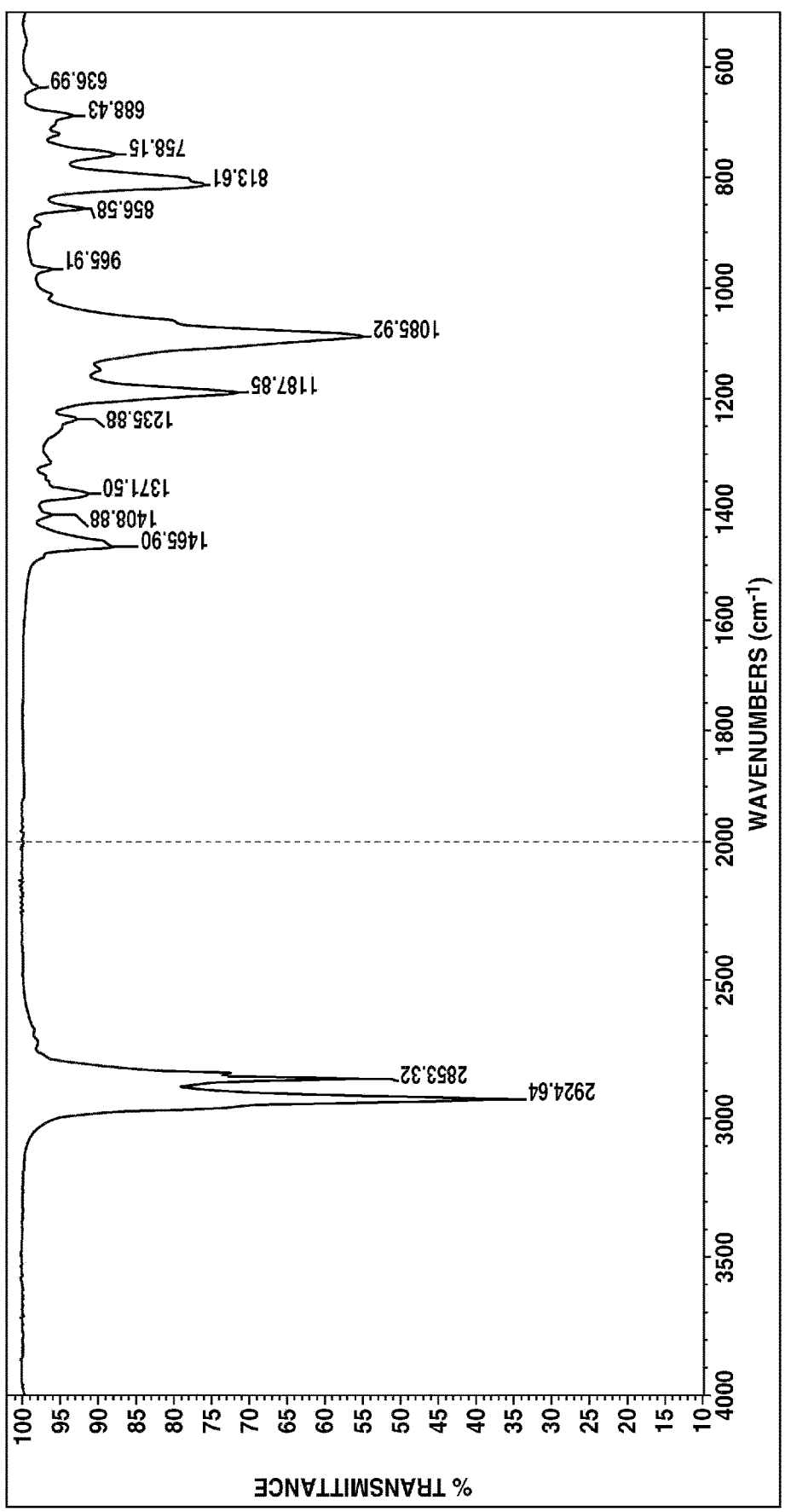
FIG. 6 is an IR spectrum diagram of the compound obtained in Synthesis Example 3.

The obtained fraction was subjected to $^1$H-NMR spectrum (deuterated chloroform solvent) measurement and IR spectrum measurement. The results are shown in FIGS. 5 and 6, respectively.

From the above results, it was confirmed that the obtained fraction was 2,2-dimethoxy-1-n-tetradecyl-1-aza-2-silacyclopentane.

Synthesis Example 4

Synthesis of
2,2-dimethoxy-1-phenyl-1-aza-2-silacyclopentane

A flask equipped with a stirrer, a reflux condenser, a dropping funnel, and a thermometer was charged with 372.4 g (4.000 mol) of aniline and heated to 150° C. After the internal temperature was stabilized, 198.7 g (1.000 mol) of chloropropyltrimethoxysilane was added dropwise over 10 hours, and the system was stirred at that temperature for 10 hours. After cooling the system to room temperature, aniline hydrochloride generated by the reaction was removed by filtration to obtain 419.4 g of a precursor reaction solution.

Next, a flask equipped with a stirrer, a reflux condenser, a fractionation head, and a thermometer was charged with 419.4 g of the precursor reaction solution and 3.8 g (0.020 mol) of a methanol solution of sodium methoxide (28% by weight sodium methoxide), and 162.0 g of a colorless transparent fraction having a boiling point of 125 to 126° C./0.3 kPa was obtained by performing distillation while distilling off generated methanol.

Figure 7:
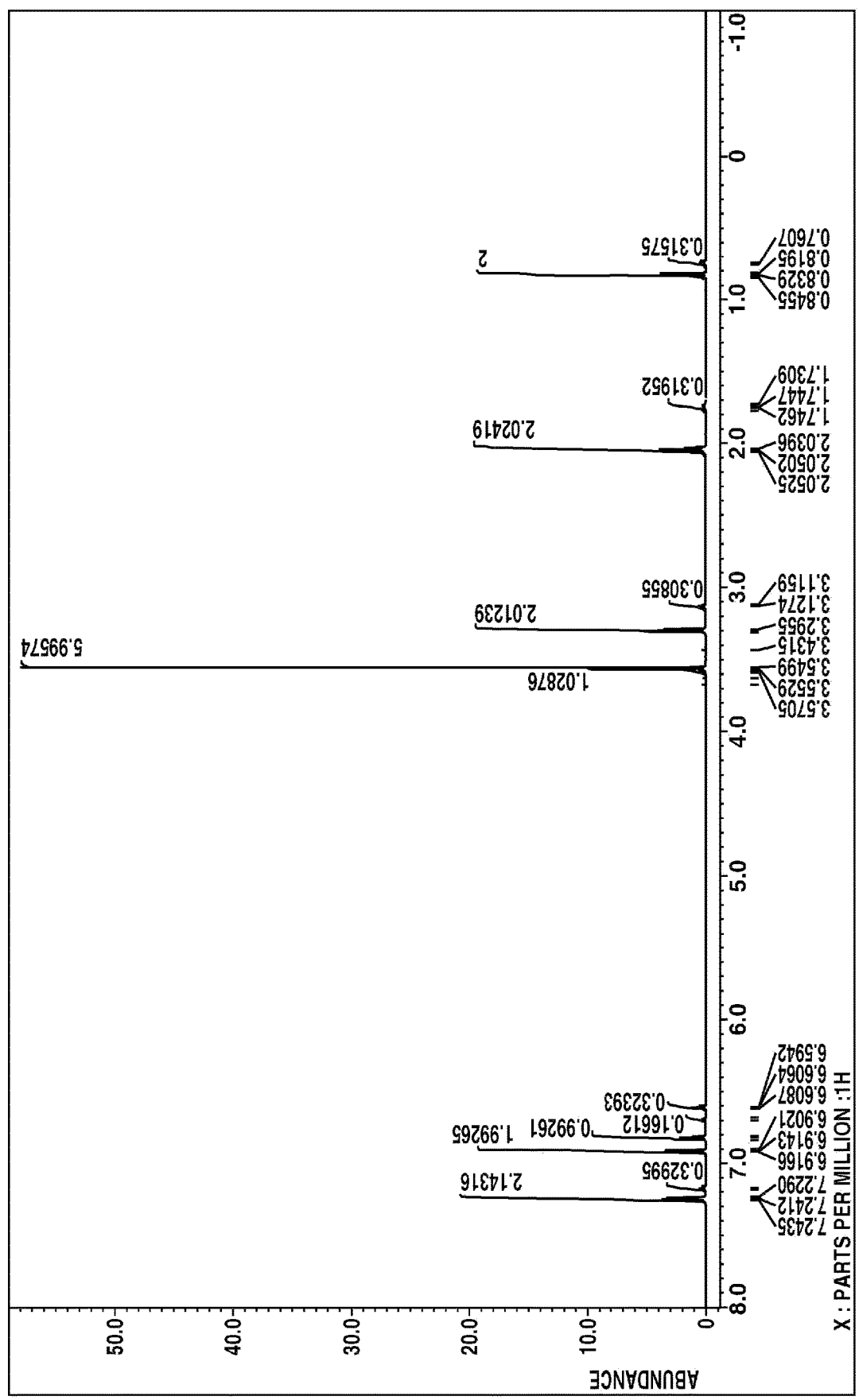
FIG. 7 is a $^1$H-NMR spectrum diagram of a compound obtained in Synthesis Example 4.
Figure 8:
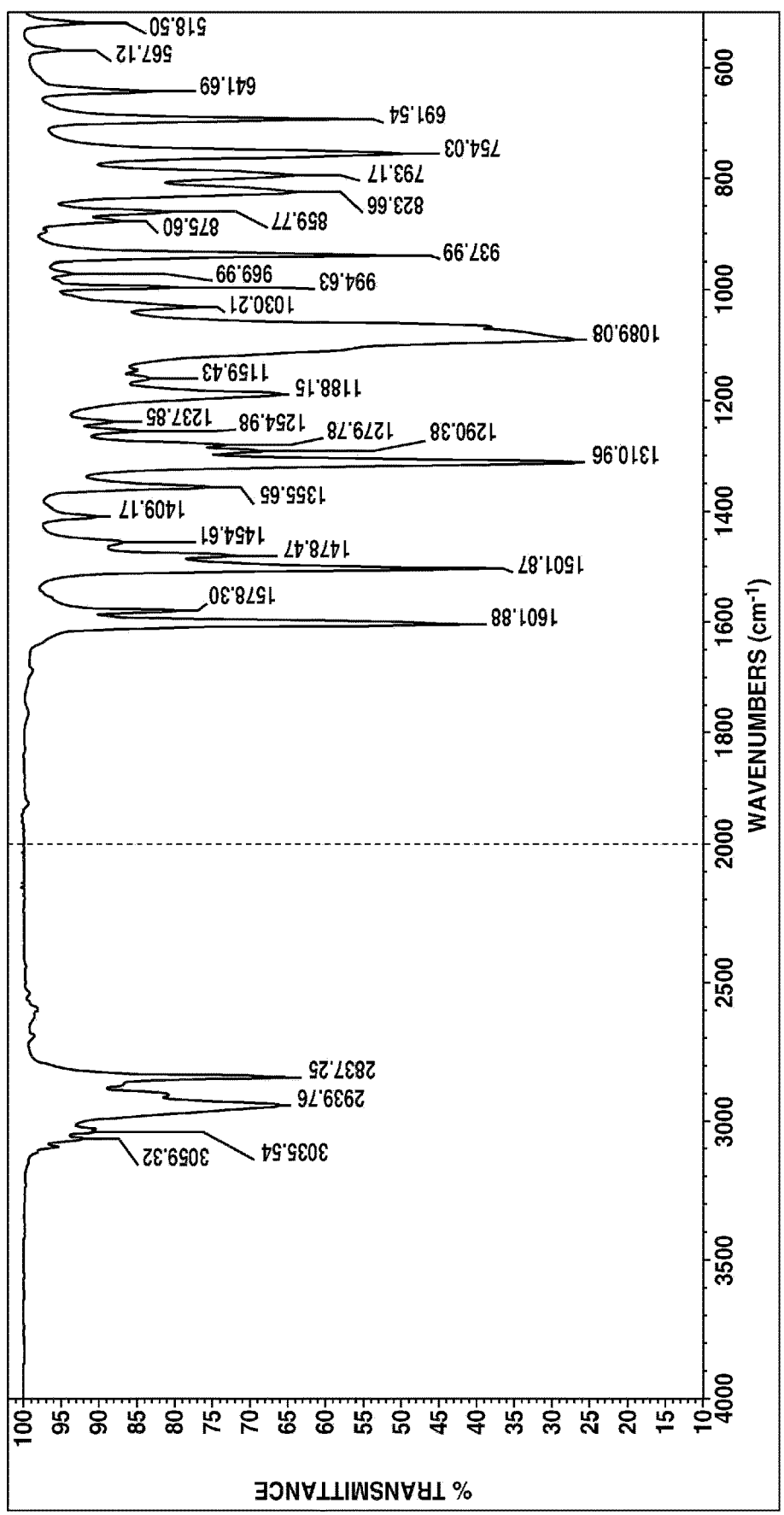
FIG. 8 is an IR spectrum diagram of the compound obtained in Synthesis Example 4.

The obtained fraction was subjected to $^1$H-NMR spectrum (deuterated chloroform solvent) measurement and IR spectrum measurement. The results are shown in FIGS. 7 and 8, respectively.

From the above results, it was confirmed that the obtained fraction was 2,2-dimethoxy-1-phenyl-1-aza-2-silacyclopentane.

Synthesis Example 5

Synthesis of 2,2-diethoxy-1-n-decyl-1-aza-2-silacyclopentane 2,2-Diethoxy-1-n-decyl-1-aza-2-silacyclopentane was synthesized in the same manner as in Synthesis Example 1, except that the starting compounds were changed to n-decylamine and chloropropyltriethoxysilane.

Synthesis Example 6

Synthesis of 2,2-diethoxy-1-n-dodecyl-1-aza-2-silacyclopentane 2,2-Diethoxy-1-n-dodecyl-1-aza-2-silacyclopentane was synthesized in the same manner as in Synthesis Example 1, except that the starting compounds were changed to n-dodecylamine and chloropropyltriethoxysilane.

[2] Preparation of Surface Treatment Agent and Surface Treatment

Example 1

A glass plate (manufactured by Matsunami Glass Ind., Ltd.; edge-polished white frost slide glass No. 1, size: 76 mm*26 mm, thickness: 0.8-1.0 mm, frosted surface: 15 mm*26 mm) cleaned by ultraviolet light and ozone in advance was subjected to surface treatment by immersing the glass plate in a solution (surface treatment agent) obtained by adding 1.3 g (0.005 mol) of 2,2-dimethoxy-1-n-octyl-1-aza-2-silacyclopentane obtained in Synthesis Example 2 to 100 mL of toluene, at 25° C. and for 30 seconds.

The glass plate was lifted from the solution, newly immersed in 100 mL of toluene and ultrasonically cleaned at 25° C. for 60 minutes by an ultrasonic cleaner (W-221 manufactured by Honda Electronics Co., Ltd.), and then dried at 50° C. for 60 minutes. Thereafter, the glass plate was subjected to post-treatment by exposing the glass plate to a relative humidity of 90% at 25° C. for 60 minutes in a thermo-hygrostat (IW243 manufactured by Yamato Scientific Co., Ltd.).

Example 2

Surface treatment and post-treatment were performed in the same manner as in Example 1 except that the immersion time of the glass plate in the surface treatment agent was changed to 60 minutes.

Example 3

Surface treatment and post-treatment were performed in the same manner as in Example 1 except that the exposure time at the relative humidity of 90% was changed to 24 hours.

Examples 4 to 6

Surface treatment and post-treatment were performed in the same manner as in Examples 1 to 3, respectively, except that 1.7 g (0.005 mol) of 2,2-dimethoxy-1-n-tetradecyl-1-aza-2-silacyclopentane obtained in Synthesis Example 3 was used as the alkoxysilane compound having a cyclic silazane structure.

Examples 7 to 9

Surface treatment and post-treatment were performed in the same manner as in Examples 1 to 3, respectively, except that 1.6 g (0.005 mol) of 2,2-diethoxy-1-n-decyl-1-aza-2-silacyclopentane obtained in Synthesis Example 5 was used as the alkoxysilane compound having a cyclic silazane structure.

Examples 10 to 12

Surface treatment and post-treatment were performed in the same manner as in Examples 1 to 3, respectively, except that 1.7 g (0.005 mol) of 2,2-diethoxy-1-n-dodecyl-1-aza-2-silacyclopentane obtained in Synthesis Example 6 was used as the alkoxysilane compound having a cyclic silazane structure.

Comparative Examples 1 to 3

Surface treatment and post-treatment were performed in the same manner as in Examples 1 to 3, respectively, except that 1.0 g (0.005 mol) of 2,2-dimethoxy-1-n-butyl-1-aza-2-silacyclopentane obtained in Synthesis Example 1 was used as the alkoxysilane compound having a cyclic silazane structure.

Comparative Examples 4-6

Surface treatment and post-treatment were performed in the same manner as in Examples 1 to 3, respectively, except that 1.1 g (0.005 mol) of 2,2-dimethoxy-1-phenyl-1-aza-2-silacyclopentane obtained in Synthesis Example 4 was used as the alkoxysilane compound having a cyclic silazane structure.

[Performance Evaluation]

1 µL of pure water was dropped on the glass plates surface-treated in Examples 1 to 12 and Comparative Examples 1 to 6 described above in a contact angle meter (DMs-401 manufactured by Kyowa Interface Science Co., Ltd.; analysis software: FAMAS), and the contact angle was measured. The results are shown in Table 1.

TABLE 1

|  |  | $R^1$ | $R^4$ | Treatment conditions | | Contact angle (°) |
|---|---|---|---|---|---|---|
|  |  |  |  | Reaction time | Exposure time |  |
| Example | 1 | n-octyl | methyl | 30 seconds | 60 minutes | 94 |
|  | 2 | n-octyl | methyl | 60 minutes | 60 minutes | 94 |
|  | 3 | n-octyl | methyl | 30 seconds | 24 hours | 94 |
|  | 4 | n-tetradecyl | methyl | 30 seconds | 60 minutes | 104 |
|  | 5 | n-tetradecyl | methyl | 60 minutes | 60 minutes | 104 |
|  | 6 | n-tetradecyl | methyl | 30 seconds | 24 hours | 104 |
|  | 7 | n-decyl | ethyl | 30 seconds | 60 minutes | 97 |
|  | 8 | n-decyl | ethyl | 60 minutes | 60 minutes | 97 |
|  | 9 | n-decyl | ethyl | 30 seconds | 24 hours | 97 |
|  | 10 | n-dodecyl | ethyl | 30 seconds | 60 minutes | 102 |
|  | 11 | n-dodecyl | ethyl | 60 minutes | 60 minutes | 102 |
|  | 12 | n-dodecyl | ethyl | 30 seconds | 24 hours | 102 |
| Comparative Example | 1 | n-butyl | methyl | 30 seconds | 60 minutes | 77 |
|  | 2 | n-butyl | methyl | 60 minutes | 60 minutes | 88 |
|  | 3 | n-butyl | methyl | 30 seconds | 24 hours | 42 |
|  | 4 | phenyl | methyl | 30 seconds | 60 minutes | 63 |
|  | 5 | phenyl | methyl | 60 minutes | 60 minutes | 91 |
|  | 6 | phenyl | methyl | 30 seconds | 24 hours | 61 |

As shown in Table 1, it can be seen that the reactivity with the substrate and the durability and stability of the substrate after the surface treatment differ depending on the substituent of the amino group in the alkoxysilane compound having a cyclic silazane structure.

When a surface treatment agent containing an alkoxysilane compound having a cyclic silazane structure including an unsubstituted linear alkyl group having 8 to 14 carbon atoms was used, the contact angle when the reaction time was short (Examples 1, 4, 7, and 10) was the same as the contact angle when the reaction time was long (Examples 2, 5, 8, and 11). That is, the cyclic silazane structure easily reacts with a hydroxyl group on the surface of the substrate to form a covalent bond, so that the contact angle reaches the maximum value in a short reaction time, and it can be seen that the surface treatment is completed even in a short reaction time. Furthermore, the contact angle does not change even with long exposure times (Examples 3, 6, 9, and 12). That is, it can be seen that the durability and stability of the substrate after the surface treatment are improved as a result of the covalent bond portion with the substrate not being hydrolyzed during the hydrolysis in the post-treatment.

In contrast, when a surface treatment agent containing an alkoxysilane compound having a cyclic silazane structure including an n-butyl group having a small steric hindrance was used, the contact angle changed in accordance with the difference in the exposure time, and it can be seen that the durability and stability of the substrate after the surface treatment is low (Comparative Examples 1 and 3). In addition, when a surface treatment agent containing an alkoxysilane compound having a cyclic silazane structure including a phenyl group having a large steric hindrance was used, the contact angle changed in accordance with difference in the reaction time, and it can be seen the reactivity with the substrate is low (Comparative Examples 4 and 5).

Japanese Patent Application No. 2018-226982 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A surface treatment agent comprising:
an alkoxysilane compound having a cyclic silazane structure represented by the following general formula (1):

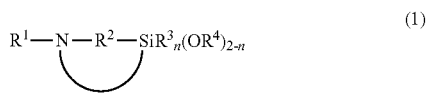

(1)

wherein $R^1$ represents an unsubstituted linear alkyl group having 8 to 14 carbon atoms, $R^2$ represents a substituted or unsubstituted alkylene group having 3 to 6 carbon atoms that may include a heteroatom, $R^3$ and $R^4$ each independently represent a substituted or unsubstituted monovalent hydrocarbon group having 1 to 10 carbon atoms, and n represents an integer of 0 or 1; and
a solvent selected from the group consisting of a hydrocarbon solvent, a ketone solvent, an ether solvent, an ester solvent, an aprotic polar solvent, a chlorinated hydrocarbon solvent, and mixtures thereof.

2. A surface treatment method comprising applying the surface treatment agent according to claim 1 on a substrate, bringing the surface treatment agent into contact with the substrate, or mixing the surface treatment agent with the substrate.

3. The surface treatment agent according to claim 1, wherein $R^1$ represents an unsubstituted linear alkyl group having 8 to 16 carbon atoms.

4. The surface treatment agent according to claim 1, wherein $R^1$ represents an unsubstituted linear alkyl group is selected from the group consisting of n-octyl, n-decyl, n-dodecyl, and n-tetradecyl groups.

5. The surface treatment agent according to claim 1, wherein $R^1$ represents an unsubstituted linear alkyl group is selected from the group consisting of n-octyl, n-nonyl, n-decyl, n-undecyl, n-dodecyl, n-tridecyl, and n-tetradecyl groups.

6. The surface treatment agent according to claim 1, wherein the hydrocarbon solvent is present and comprises: pentane, hexane, cyclohexane, heptane, isooctane, benzene, toluene, xylene, or mixtures thereof.

7. The surface treatment agent according to claim 1, wherein the ketone solvent is present and comprises: acetone, methyl isobutyl ketone, or mixtures thereof.

8. The surface treatment agent according to claim 1, wherein the ether solvent is present and comprises: diethyl ether, tetrahydrofuran, dioxane, or mixtures thereof.

9. The surface treatment agent according to claim 1, wherein the ester solvent is present and comprises: ethyl acetate, butyl acetate, or mixtures thereof.

10. The surface treatment agent according to claim 1, wherein the aprotic polar solvent is present and comprises: acetonitrile, N, N-dimethylformamide, or mixtures thereof.

11. The surface treatment agent according to claim 1, wherein the chlorinated hydrocarbon is present and comprises: dichloromethane, chloroform, or mixtures thereof.

* * * * *